Aug. 11, 1942.                 G. R. STIBITZ                 2,292,489
                               COUNTING DEVICE
                          Filed Nov. 26, 1941            3 Sheets-Sheet 1

INVENTOR
G. R. STIBITZ
BY
*P. C. Smith*
ATTORNEY

Aug. 11, 1942.  G. R. STIBITZ  2,292,489
COUNTING DEVICE
Filed Nov. 26, 1941  3 Sheets-Sheet 2
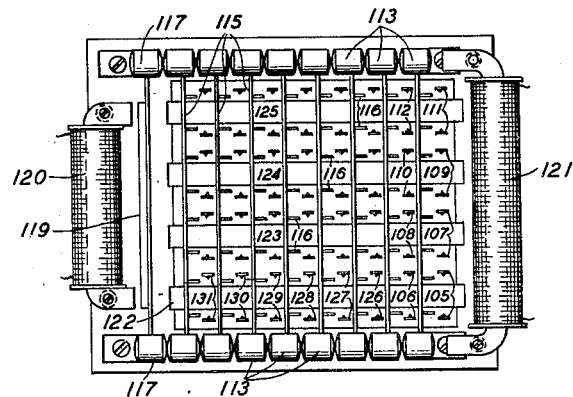
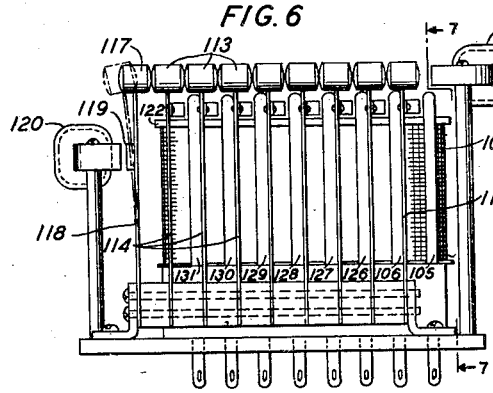
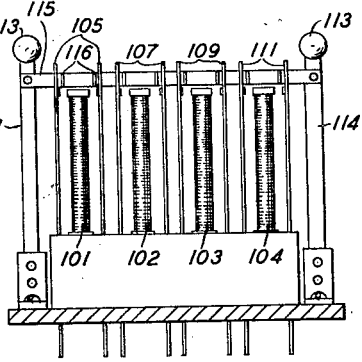
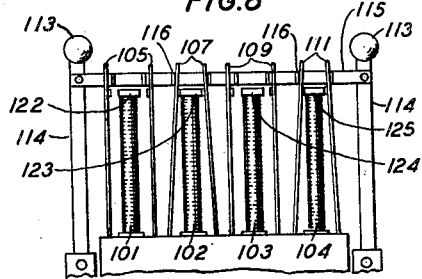
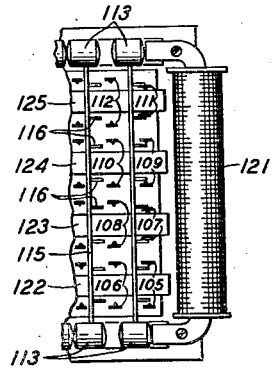
INVENTOR
G. R. STIBITZ
BY
P. C. Smith
ATTORNEY Aug. 11, 1942.　　　　G. R. STIBITZ　　　　2,292,489
COUNTING DEVICE
Filed Nov. 26, 1941　　　3 Sheets-Sheet 3
FIG. 10
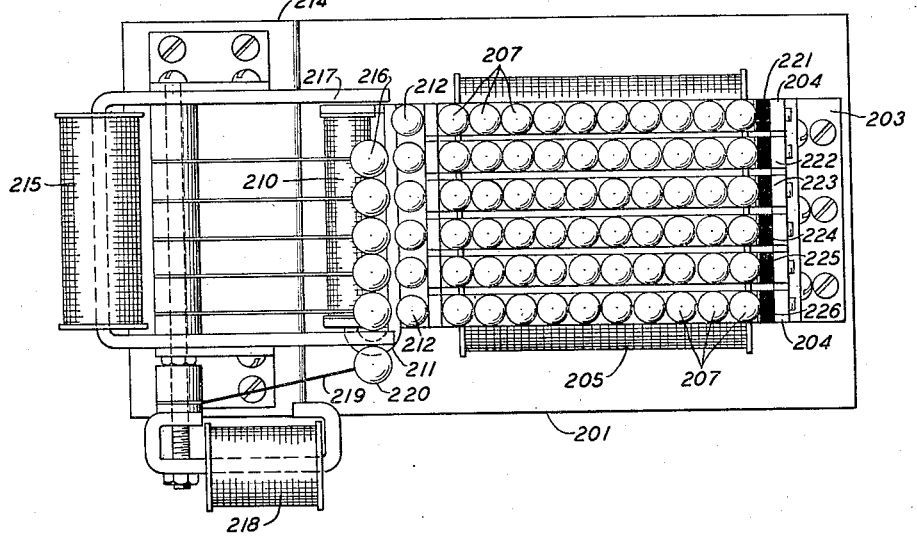
FIG. 11
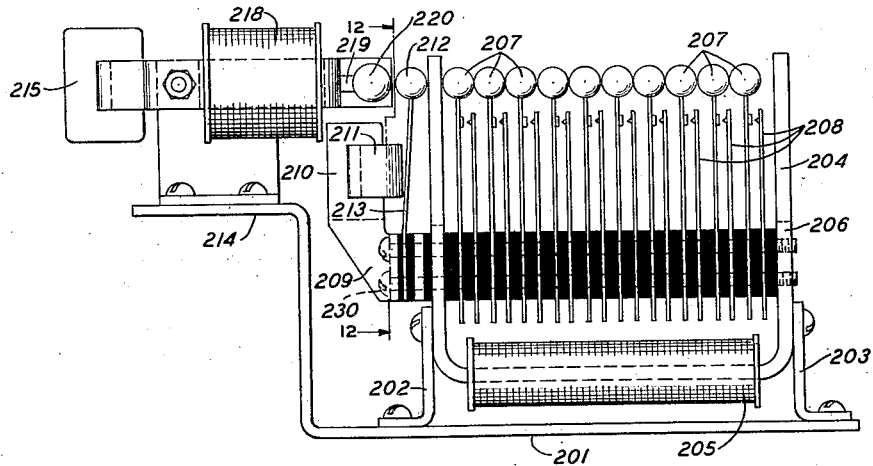
FIG. 12
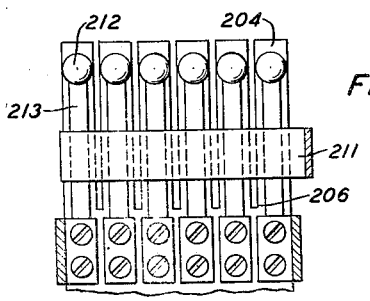
INVENTOR
G. R. STIBITZ
BY
ATTORNEY Patented Aug. 11, 1942

2,292,489

UNITED STATES PATENT OFFICE 2,292,489

COUNTING DEVICE

George R. Stibitz, Boonton, N. J., assignor to Bell Telephone Laboratories, Incorporated, New York, N. Y., a corporation of New York Application November 26, 1941, Serial No. 420,536

7 Claims. (Cl. 177—353)

This invention relates to pulse counting arrangements and has for its object to provide novel pulse counting and registering means.

Heretofore, pulse counting arrangements have required one relay per pulse, except where the use of one or more auxiliary relays permitted part of the relays to reoperate to count subsequent pulses.

In accordance with the present invention, a pulse counting device is provided, comprising a unitary structure, operated directly by a pulse responsive magnet.

The functioning of this pulse counting device relies on the phenomenon demonstrated by the well-known experiment in physics, wherein a number of balls are suspended on strings so arranged that the balls hang in a straight line and adjacent balls touch each other lightly. If, in such an arrangement, the last ball on one end of the row is moved out and allowed to swing back and hit the next ball, an impulsive wave travels down the row and the last ball on the opposite end is thrown off, all of the other balls remaining in position.

The present invention takes advantage of this phenomenon, to provide a series of elements each having two positions of rest, together with pulse responsive means to move a number of said elements from one position of rest to the other, the number of elements moved being a function of the number of pulses acting on said pulse responsive means.

According to a further feature of the invention such a device serves to prepare a series of registers for receiving a corresponding series of registrations.

Furthermore, two such devices may cooperate to act as a complete register for a series of registrations.

These and other features of the invention will be more clearly understood from a consideration of the following description in connection with the drawings in which:

Figs. 5, 6, 7, 8 and 9 show the device as embodied in a sequence arrangement for recording a set of registrations;

Figs. 10, 11 and 12 show two such devices cooperating to register a complete designation.

Figure 1:
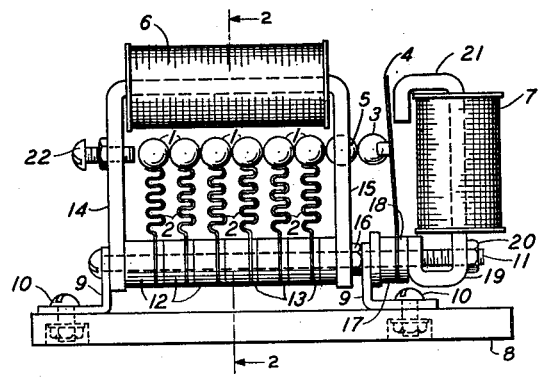
Figs. 1, 2, 3 and 4 show a simple pulse counting device.
Figure 2:
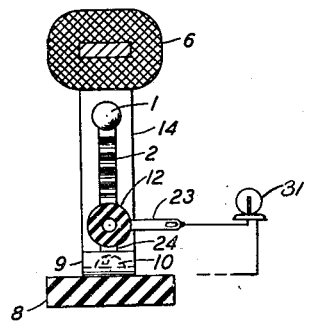
Figure 3:
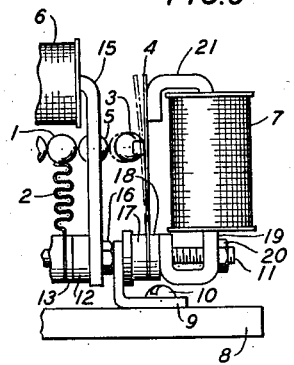
Figure 4:
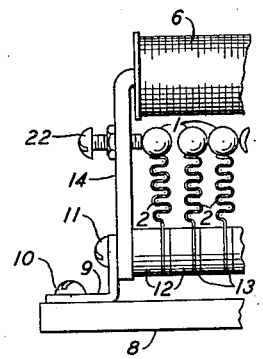

Referring first to Figs. 1 to 4 in which the same parts bear the same designations, Fig. 1 shows a side view of the counting device; Fig. 2 shows a cross section of the device at plane 2 of Fig. 1; Fig. 3 shows the pulsing magnet in action, and Fig. 4 shows a portion of the device after one pulse has been received. In these figures a series of steel balls 1, which may be similar to those used in ball bearings, are mounted on springs 2 so that they touch each other lightly. A similar ball 3 is mounted on a spring armature 4 and normally rests against a fixed ball 5 against which in turn rest the series of balls 1. The legs 14 and 15 of the core of an electromagnet 6 embrace the series of balls 1 while magnet 7 controls the armature 4.

The precise form of the mounting is not important but one has been shown by way of example. A base 8 of insulating material has two L-shaped brackets 9 fastened thereto by screws 10. The brackets 9 support a bolt 11.

On bolt 11 are threaded the springs 2, each associated with a washer 13 bearing a soldering terminal 23. One soldering terminal 23, connected to an indicating device such as lamp 31, may be seen in Fig. 2. The springs are separated from each other and held in contact with their associated washers by insulating bushings 12. The pole-pieces 14 and 15 of magnet 6 have slots 24 (Fig. 2) which slide onto bolt 11 at the ends of the spring pile-up and with the springs and bushings are held in place by nut 16.

On the outer end of bolt 11 are two insulating bushings 17 and 18 holding armature 4 in place. The core of magnet 7 has a U-shaped extension 19 through which bolt 11 passes, the magnet being held in place by nut 20.

When it is desired to operate the counting device, the circuit of coil 6 is closed, creating a magnetic flux through balls 1 tending to hold them against ball 5. The pulsing circuit is connected to magnet 7, which upon its energization draws spring armature 4 against pole-piece 21 as shown in Fig. 3. At the first pulse the spring armature 4 is released and strikes ball 3 against the fixed ball 5, transmitting the energy of the blow to the last ball which moves over into the position shown in Fig. 4. The effect of magnet 6 is to hold the moved ball against pole-piece 14. Each additional pulse moves another ball to its alternate position so that the number of balls so moved is an indication of the number of pulses received.

Screw 22 acts both as a back stop for the balls 1, and as one terminal for a circuit completed through the moved balls and their associated soldering terminals to any desired form of indicator, for example lamp 31 (Fig. 2). After the indication has served its purpose the circuit of magnet 6 may be opened whereupon the balls restore to their normal position.

Figure 13:
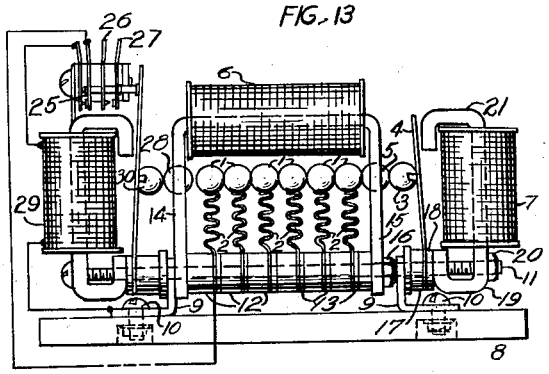
Fig. 13 shows the pulse counting device of Figs. 1 to 4 modified to act as a pulse storing repeater.

As shown in Fig. 13 this device may be modified to act as a storing repeater of pulses by placing a pulsing magnet 29 with a self-interrupting contact 25 and a pair of pulsing contacts 26 and 27 at the left end of the device. Magnet 29 then drives a ball toward the right for each pulse generated by contacts 26 and 27. If the circuit of magnet 20 is closed, as indicated, by the contact of ball 30 against ball 28 in its left-hand position the out-pulsing may overlap the in-pulsing and will terminate when all balls are again at the right.

Figs. 5 to 9 show how an impact relay of the type described may be used in place of the series of relays used as transfer relays in registering or transferring telephone designations. Fig. 5 shows a top view of the register and the transfer device. Fig. 6 shows a side view of the device and Fig. 7 shows a cross section at the plane 7 of Fig. 6. Figs. 8 and 9 show the register after having one registration locked in on it.

The register comprises four elongated coils 101, 102, 103 and 104 having elongated pole-pieces 122, 123, 124 and 125. Each relay has eight pairs of armatures, one pair for each of the eight possible digits comprising a telephone designation to be registered. For example, relay 101 when energized, draws all of the pairs of armatures 105, 106, and 126 to 131 against pole-piece 122. Similarly relay 102 when operated attracts all of the pairs of armatures 107, 108, etc. against pole-piece 123, relays 103 and 104 acting in the corresponding manner. To simplify the drawings no contacts have been shown for the armatures but it is obvious that any desired spring combinations might be controlled by the armatures shown.

The transfer arrangement includes two sets of impact elements 113, mounted on springs 114 as shown in Fig. 6. It may be noted that the impact elements in this case are cylinders, but the impact faces are rounded so that the contact between elements is made at a point as in the previous case.

Connecting the cylinders of the two rows in pairs are strips 115, which may be formed of metal or other material and fastened to the springs 114 by any convenient means. At predetermined positions on the strips 115 are ears 116, which may be formed from the strip or mounted thereon in any suitable manner. Fig. 8, which shows relays 101 and 103 normal and relays 102 and 104 operated, also indicates the relative positions of the ears 116 and the relay armatures when normal and when operated.

The cylinders 117 at one end of the rows are mounted on a spring 118 which carries an armature 119 acted on by the magnet 120. The magnet 121 at the opposite end of the device serves to set up a magnetic circuit through the cylinders 113 when they have been moved to their alternate positions.

When a registration is to be set up, the register arrangement is normal as shown in Fig. 5 and circuits are prepared for the set of register relays. In response to the first digit, the relays of the register attract their armatures, as shown for example in Fig. 8, where relay 102 has drawn all of its armatures, such as pair 107, against pole-piece 122 and relay 104 has drawn all of its armatures, as indicated by pair 111, against pole-piece 123. Just prior to the time that relays 102 and 104 are operated magnet 120 is energized drawing cylinders 117 into the dotted position (Fig. 6). When the register relays have operated the circuit of magnet 120 is opened and cylinders 117 are released to strike against the rows of cylinders 113 and move the right pair of cylinders 113 into their alternate position as shown in Fig. 9.

These cylinders carry with them the attached bar 115 with the associated ears 116. The pairs of springs 105 and 109, being in normal position, are unaffected by the movement of bar 115, the pairs of springs 107 and 111 having been pressed against pole-pieces 122 and 123 are within the corresponding pairs of ears 116. Therefore the pairs of armatures 107 and 111 are held in their operated positions by the ears 116 after the circuits of the register relays have been opened but all of the remaining pairs of armatures are released. Assuming that the next digit to be registered causes the energization of relays 101, 102 and 104, the pairs of armatures 105, etc., 108, etc. and 112, etc. will be drawn against the respective pole-pieces 122, 123 and 125. The pairs of armatures 107 and 111 being locked in attracted position cannot be further attracted while the pair of armatures 105 is drawn against the outer sides of the ears 116. The impact delivered by hammer 117 in response to this second digit registration transfers the second pair of cylinders 113 to their alternate position, locking the pairs of armatures 106, 108 and 112 in place, after which all of the unlocked pairs of armatures are restored by the deenergization of the register relays. Further digits are registered in a similar manner. Contacts controlled by the locked armatures would be used for controlling selections. A set of relay registers operated in code and the associated transfer relays for which the device of Figs. 5 to 9 may be substituted is shown in Patent 1,708,909, granted to W. H. Matthies April 16, 1929. When the registration is no longer needed and magnet 121 is deenergized, the cylinders assume their normal position and release the register armatures.

Figs. 10, 11 and 12 show a further development of the invention into a unitary registering device. In general, it comprises one ball type counting relay such as shown in Fig. 1 for each item to be registered, and a similar device so mounted with relation to the registers as to render only one register effective at a time.

Fig. 10 shows a top view of such a registering device, Fig. 11 shows the side view of the device, while Fig. 12 shows a cross section thereof along the plane 12 of Fig. 11.

As shown in Figs. 10 to 12, a base 201 supports by means of brackets 202 and 203 a flat U-shaped core 204 on which is wound a coil 205. Between the legs of the core 204 are mounted a plurality of sets of ten balls 207, one set for each digit to be registered together with their associated sets of contact springs 208. Six sets of balls have been shown but any suitable number might be used. Above the point 206, the pole-pieces 204 are divided into sections, one for each set of balls.

On a bracket 209, carried by the mounting screws 230 which secure the contact springs 208 to the core 204, is mounted the pulsing magnet 210, having a core 211. The armature of magnet 210 includes one ball 212 and corresponding mounting spring 213 for each register, in the present case six balls and mounting springs, all of which tend to move when magnet 210 is energized.

However, on a bracket 214 formed integrally with base 201 is mounted a ball counting device similar to that of Fig. 1. It comprises a holding magnet 215, having a U-shaped core 217 between the legs of which is mounted a series of balls 216. At one side is mounted a pulsing magnet 218 having an armature 219 on which is mounted a striking ball 220. One less ball 216 is provided than the number of registers.

As shown in Fig. 11 the balls 216 are in vertical alignment with the armature balls 212 and with the register balls 207. With the device normal, one ball 216 is in horizontal alignment with each of the registers 222 to 226.

When a registration is to be made, hold magnets 215 and 205 would be energized. In preparation for the reception of each digit, magnet 218 would also be energized, after which magnet 210 would respond to the incoming pulses. Suitable circuits for performing these operations may be found in the above-identified Matthies patent. While all of the armature balls 212 are attracted, only the ball 212 acting on register 221 is free to move and therefore only balls of register 221 are moved to their alternate position in response to the pulses, where they are held by magnet 205 to register the number of pulses received.

At the end of the digit, magnet 218 releases, ball 220 hits the forward leg of core 217 and the farthest ball 216 is moved to its alternate position where it is held attracted to the rear leg of core 217 by magnet 215. This permits register 222 to receive the next digit, after which the second ball 216 is moved, and so on until each of the registers has received a registration.

From the foregoing description it is apparent that the arrangement of Figs. 10 to 12 provides a very compact and economical arrangement for registering telephone designations.

What is claimed is:

1. An impulse counting device comprising a row of resilient magnetic movable members, a magnetic circuit for holding said members in contact with one other, means for displacing said members comprising a hammer arranged to strike an end member in response to impulses to move a member from the other end of the row, the number of members moved being in direct relation to the number of impulses and indicating means operated in accordance with the number of members moved.

2. A counting device comprising a row of spring mounted resilient balls of magnetic material, each having a normal and an alternate position, a magnetic circuit for holding said balls in either of said positions, a counting magnet, an armature for said magnet carrying an additional ball, said armature and additional ball arranged to apply an impact to said row of balls at each event to be counted, the ball at the end of the row moving to its alternate position in response to said impact, indicating means and means controlled by said balls in their alternate positions to control said indicating means.

3. An impulse counting device comprising a row of spring mounted resilient balls of magnetic material, each having a normal and an alternate position, a magnetic circuit for holding said balls in either of said positions, an impulse receiving magnet, an armature for said magnet carrying an additional ball, said armature and additional ball arranged to apply an impact to said row of balls at each impulse, the last ball remaining in normal position moving to its alternate position in response to each impact, indicating means and means controlled by the balls in their alternate positions to control said indicating means.

4. A registering device for registering a plurality of items comprising a plurality of register relays arranged to be operated according to a code, a set of armatures for each item to be registered, each relay controlling at least one armature in each set, and means for locking in said registrations independent of said relays comprising a row of resilient magnetic movable members, one member for each set of armatures, each member having a normal and an alternate position, means on said members effective in the alternate position to hold an operated armature in said operated position, a hammer arranged to strike the end member of said row at each operation of said register relays to move the member at the opposite end of said row into its alternate position, and a magnetic circuit to hold said members in said alternate position.

5. A registering device for registering a plurality of items comprising a plurality of register relays arranged to be operated according to a code, a set of armatures for each item to be registered, each relay controlling at least one armature in each set, and means for locking in said registrations independent of said relays comprising two rows of resilient magnetic movable members, one member in each row for each set of armatures, each member having a normal and an alternate position, bars connecting corresponding members of said rows in pairs, ears on said bars effective in the alternate position of said pair of members to engage operated armatures of the corresponding set, a pair of hammers arranged to strike the end members of said rows as each register is operated to move the members at the opposite end of said rows into their alternate positions and a magnetic circuit to hold said members in said alternate positions.

6. A registering device including a plurality of individual registers, each register comprising a row of resilient magnetic movable members, a magnetic circuit for holding said members in contact with one another, and a hammer arranged to strike an end member of the row in response to a series of received indications to move a corresponding number of members from the other end of the row, and means for rendering said registers operative in succession comprising a row of auxiliary resilient magnetic movable members, an auxiliary magnetic circuit for holding said auxiliary members in contact and an auxiliary hammer arranged to strike said auxiliary members following each series of indications, there being one less auxiliary member than there are registers, said auxiliary members being arranged in alignment with the members of said registers to prevent motion of all but one of said register hammers, said auxiliary members being moved one at a time by the blows of said auxiliary hammer to permit successive hammers to respond to successive series of indications.

7. An impulse storing and repeating device comprising a row of spring mounted resilient balls of magnetic material, each having a normal and an alternate position, a magnetic circuit for holding said balls in either of said positions, an impulse receiving magnet, an armature for said magnet carrying an additional ball, said armature and additional ball arranged to apply an impact to said row of balls at each impulse, the last ball remaining in normal position moving to its alternate position in response to each impact, a second magnet, a set of impulse transmitting contacts, an armature for said second magnet carrying another ball in position to strike the balls of said row in alternate position to restore them one at a time to their normal position, said last-mentioned armature also controlling said impulse transmitting contacts, said ball at the end of said row controlling said second magnet.

GEORGE R. STIBITZ